(12) United States Patent
Lang

(10) Patent No.: US 7,815,055 B2
(45) Date of Patent: Oct. 19, 2010

(54) BICYCLE STORAGE SYSTEM

(75) Inventor: Andrew Lang, London (GB)

(73) Assignee: Andrew Lang Product Design Limited, London (GB)

( * ) Notice: Subject to any disclaimer, the term of this patent is extended or adjusted under 35 U.S.C. 154(b) by 65 days.

(21) Appl. No.: 10/546,742

(22) PCT Filed: Feb. 27, 2004

(86) PCT No.: PCT/GB2004/000807

§ 371 (c)(1),
(2), (4) Date: Aug. 25, 2005

(87) PCT Pub. No.: WO2004/076268

PCT Pub. Date: Sep. 10, 2004

(65) Prior Publication Data

US 2006/0180554 A1 Aug. 17, 2006

(30) Foreign Application Priority Data

Feb. 27, 2003 (GB) .................................. 0304438.5

(51) Int. Cl.
*A47F 7/00* (2006.01)
(52) U.S. Cl. ........................ 211/18; 211/87.01
(58) Field of Classification Search .................. 211/17, 211/18–20, 22, 23, 85.7, 87.01, 183, 13.1; D12/162; 248/339, 307, 304, 301; 206/480, 206/485, 477, 478; 224/926
See application file for complete search history.

(56) References Cited

U.S. PATENT DOCUMENTS

| 569,289 | A | * | 10/1896 | Lynch | 211/17 |
| 4,097,015 | A | * | 6/1978 | Frishman | 248/339 |
| 5,054,628 | A | | 10/1991 | Allen | 211/104 |
| 5,074,419 | A | | 12/1991 | Smith | 211/17 |
| 5,078,276 | A | | 1/1992 | Rogge et al. | 211/18 |
| 5,082,123 | A | | 1/1992 | Lamb | 211/87 |
| 5,092,504 | A | * | 3/1992 | Hannes et al. | 224/403 |
| 5,294,006 | A | * | 3/1994 | Deschino | 211/18 |
| 5,332,104 | A | | 7/1994 | Santella | 211/18 |
| 5,447,241 | A | * | 9/1995 | Bureau | 211/18 |
| 5,848,838 | A | * | 12/1998 | Presta | 362/249.01 |
| 6,712,379 | B2 | * | 3/2004 | Graham et al. | 280/480 |
| 2002/0125681 | A1 | | 9/2002 | Graham et al. | |

FOREIGN PATENT DOCUMENTS

| DE | 440532 | 2/1927 |
| DE | 87 12 210 U | 10/1987 |
| DE | 92 04 396.8 | 7/1992 |
| FR | 2 377 317 | 8/1978 |

(Continued)

*Primary Examiner*—Jennifer E. Novosad
(74) *Attorney, Agent, or Firm*—Saul Ewing LLP (57) ABSTRACT

A bicycle storage system for storing a bicycle, comprising: (i) a first flange to support a lower surface of a bicycle frame, the frame rotating about this first flange under the weight of the rear of the bicycle; and (ii) a second flange to contact an upper surface of that frame to prevent further rotation of the frame about the first flange, the flanges being arranged to then securely hold the frame. The first and the second flanges may be formed into a single, sinuous edge of a hollow cylindrical unit; this unit may be sized to store bicycle accessories.

25 Claims, 8 Drawing Sheets

FOREIGN PATENT DOCUMENTS

| | | |
|---|---|---|
| FR | 2 735 411 | 12/1996 |
| GB | 237820 | 8/1925 |
| GB | 604659 | 7/1948 |
| GB | 2 242 877 A | 10/1991 |
| GB | 2 280 653 A | 8/1995 |

\* cited by examiner

BICYCLE STORAGE SYSTEM

CROSS REFERENCE TO RELATED APPLICATIONS

This application claims the priority of PCT Application No. PCT/GB2004/000807 filed on Feb. 27, 2004 and GB Patent Application No. 0304438.5 filed on Feb. 27, 2003, the entire contents of which are hereby incorporated in total by reference.

BACKGROUND OF THE INVENTION

1. Field of the Invention

This invention relates to a bicycle storage system.

2. Description of the Prior Art

Bicycle storage systems are used in domestic and retail, and exhibition settings; there are many simple designs which enable a bicycle to be hung off from the floor, such as a pair of metal arms upon which the top frame, tube or saddle of a bicycle can be rested. The arms may be wall mounted or extend from a stand. More elaborate ceiling mounted racks are also known; these enable a bicycle to be suspended from the ceiling from a pair of hooks on which one or other part of the bicycle rests. One disadvantage of systems that rely on a bicycle frame to rest on a pair of supports is that it can be difficult to secure and mount horizontally a bicycle with a steeply sloping frame (e.g. some mountain bikes and most ladies' bikes). Another disadvantage is that the generally rudimentary metal design is not attractive. A final disadvantage is that they offer no integral storage space, e.g. to store cycling accessories, such as lights, gloves, reflective bands etc.

SUMMARY OF THE INVENTION

The present invention is a bicycle storage system for storing a bicycle, comprising:

(i) a first flange to support a lower surface of a bicycle frame, the frame rotating about this first flange under the weight of the rear of the bicycle; and (ii) a second flange to contact an upper surface of that frame to prevent further rotation of the frame about the first flange, the flanges being arranged to then securely hold the frame.

The bicycle can then be held in a horizontal orientation. The first and the second flanges may be formed into a single, sinuous edge of a hollow unit (such as a cylindrical body); this unit may be sized to store bicycle accessories (such as lights, gloves etc.).

The unit may be a one piece moulded object; the preferred implementation is a polymer type material (e.g a white polypropylene or HDPE) although a fabricated metal structure may also be used where appropriate. The unit may include an aperture sized to enable a lock to be passed through to lock the frame to the cylindrical body.

The bicycle storage system of the present invention can be used as a domestic, office, public space and educational institution bicycle storage system, as well as a retail and exhibition storage system. The preferred implementation is not only aesthetic, but is highly functional since it offers integral storage and enables different sizes and shape of frame to be easily accommodated.

These and other features of the invention will be more fully understood by reference to the following drawings.

BRIEF DESCRIPTION OF THE DRAWINGS

FIG. 1 is an isometric view of an implementation of the present invention from the top. An example is a bicycle storage system for storing a bicycle, said system formed as a unit and the unit including a rear face that is adapted to be fixed to a wall abutting the rear face, said unit comprising: (i) a first region defining an upwardly facing aperture, the first region shaped to support a lower surface of a bicycle frame; and (ii) a second region defining a downwardly facing aperture, the second region shaped to contact an upper surface of that frame;

FIG. 3 is an isometric view of a preferred implementation of the present invention from the top. An example is a bicycle storage system for storing a bicycle, said system formed as a unit and the unit including a rear face that is adapted to be fixed to a wall abutting the rear face, said unit comprising: (i) a first region defining an upwardly facing aperture, the first region shaped to support a lower surface of a bicycle frame; and (ii) a second region defining a downwardly facing aperture, the second region shaped to contact an upper surface of that frame;

FIGS. 6, 7, 8 are isometric views of alternative implementations. In each case an example is a bicycle storage system for storing a bicycle, said system formed as a unit and the unit including a rear face that is adapted to be fixed to a wall abutting the rear face, said unit comprising: (i) a first region defining an upwardly facing aperture, the first region shaped to support a lower surface of a bicycle frame; and (ii) a second region defining a downwardly facing aperture, the second region shaped to contact an upper surface of that frame.

DETAILED DESCRIPTION

Figure 1:
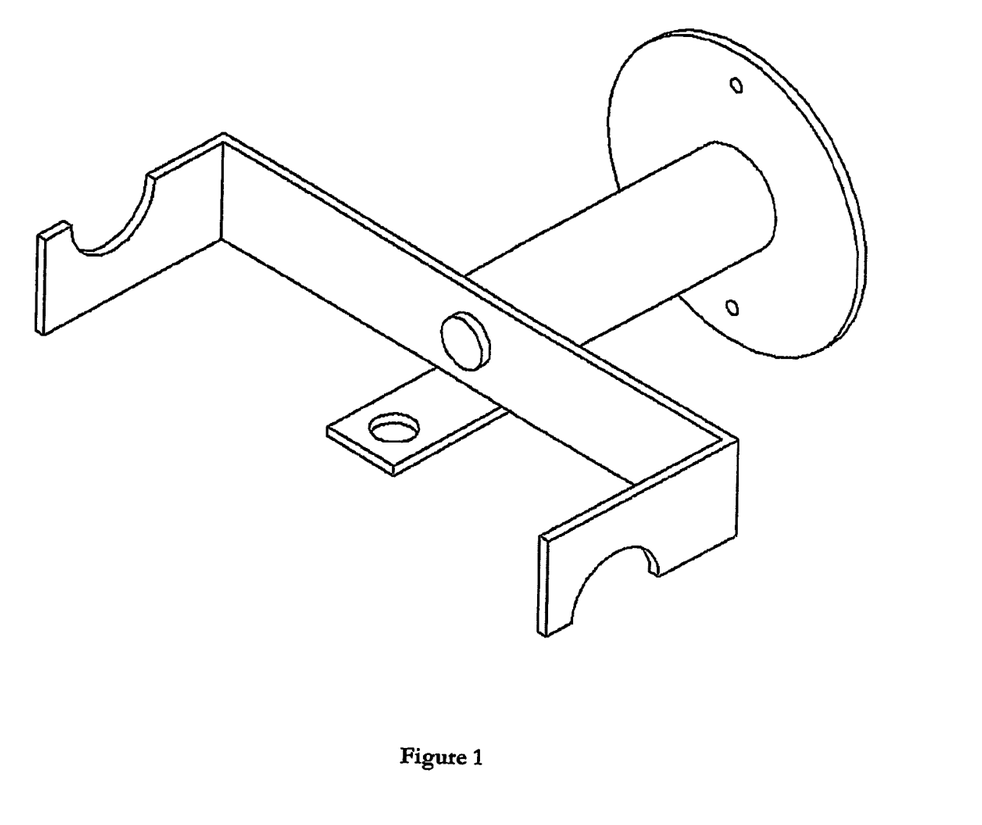
Figure 2:
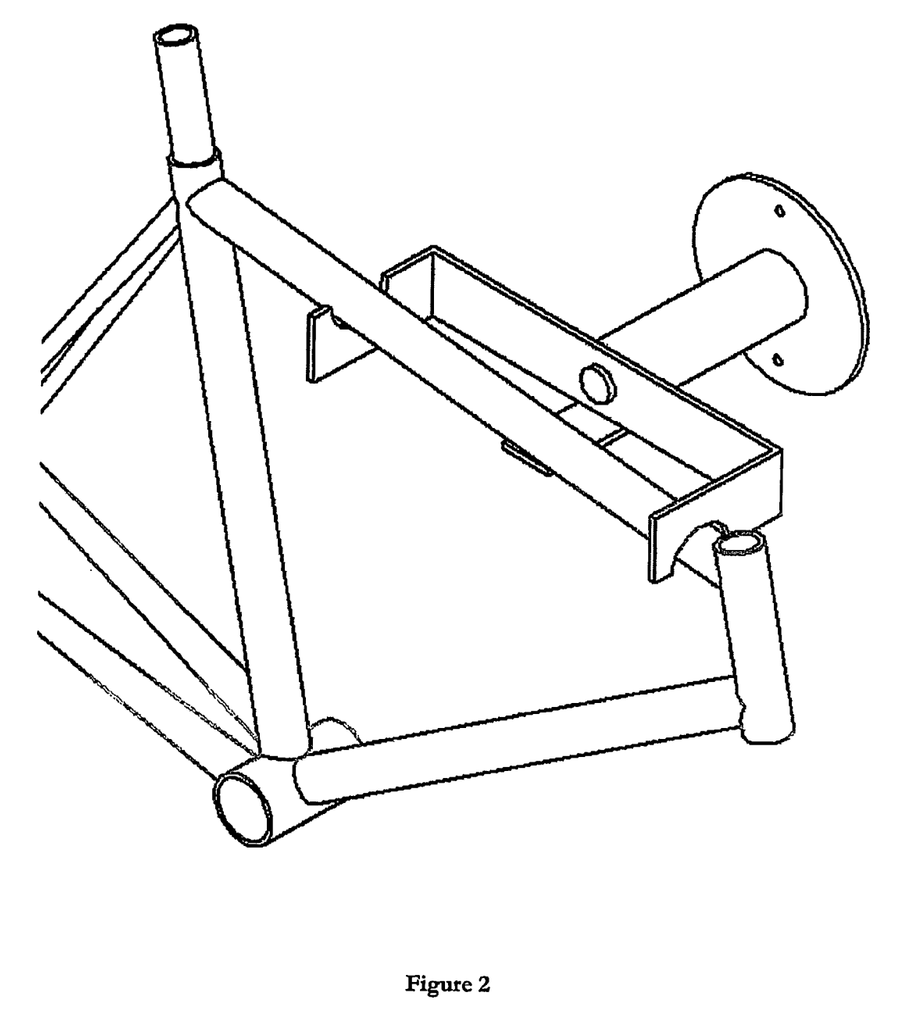
FIG. 2 shows the FIG. 1 implementation holding part of a bicycle frame.

Referring to the drawings, FIG. 1 shows the most basic implementation: a metal bar extends from a fixing plate; the bar comprises two end arms, each with a semi-circular aperture; one aperture faces upwards and will, in use, grip and support the lower surface of the bicycle top tube, the other aperture faces downwards and will, in use, contact the upper surface of the top tube to stop the frame rotating. FIG. 2 shows this implementation actually storing a bicycle frame; the frame is kept in a horizontal orientation.

Figure 3:
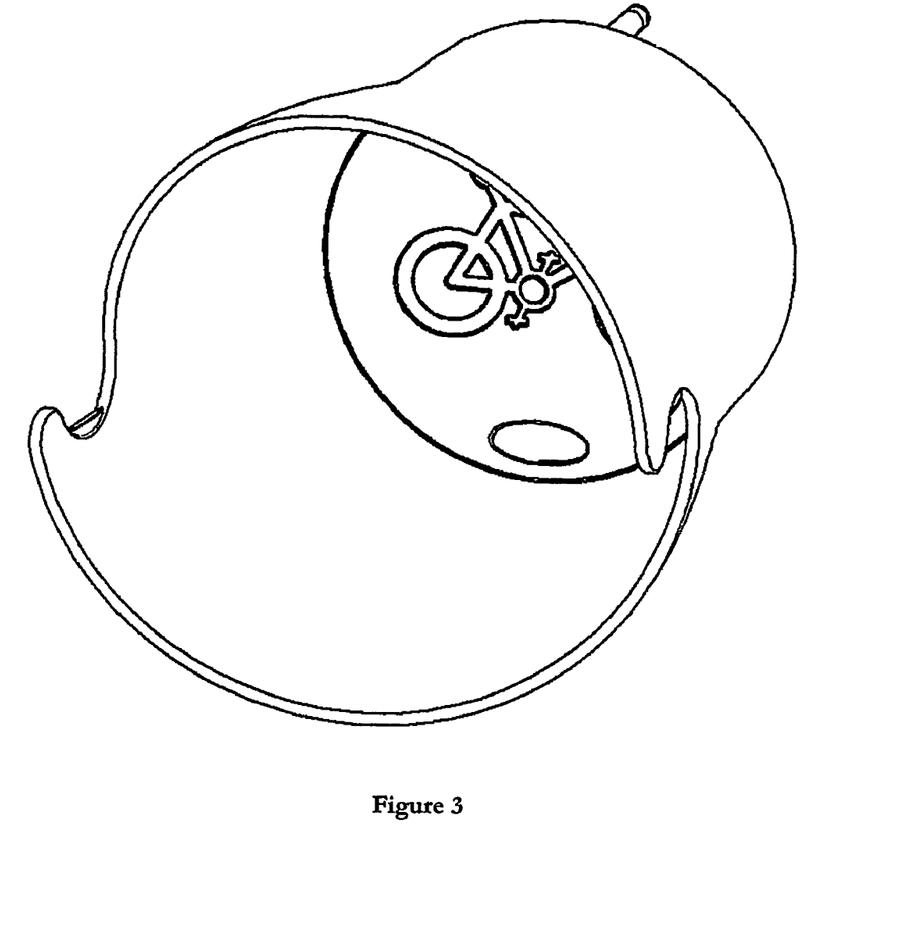
Figure 4:
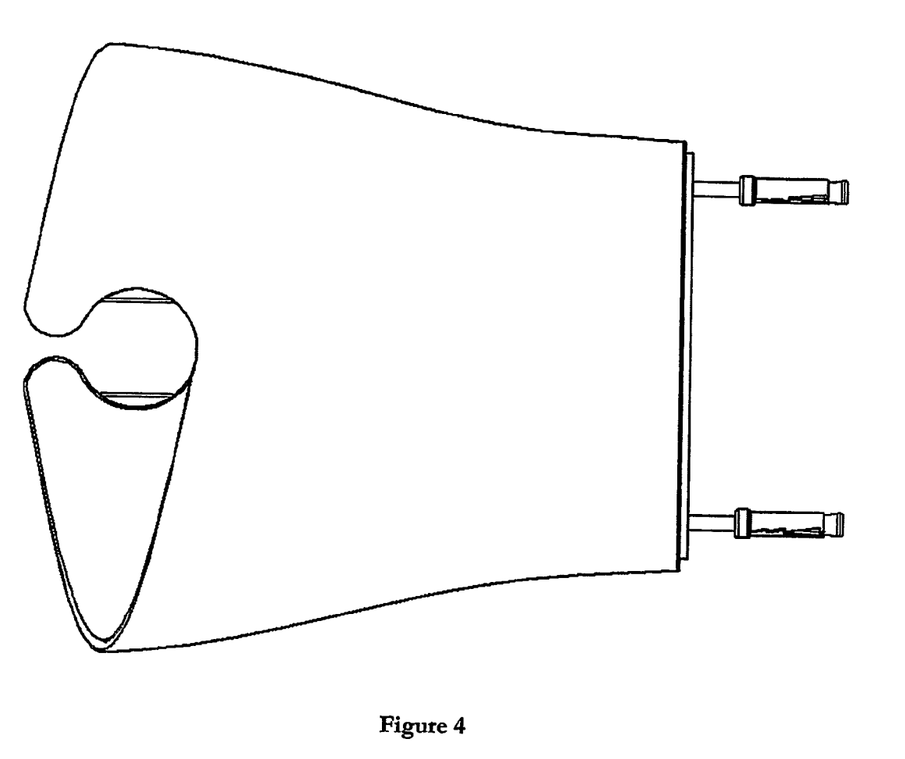
FIG. 4 is a side elevation view of the preferred implementation.
Figure 5:
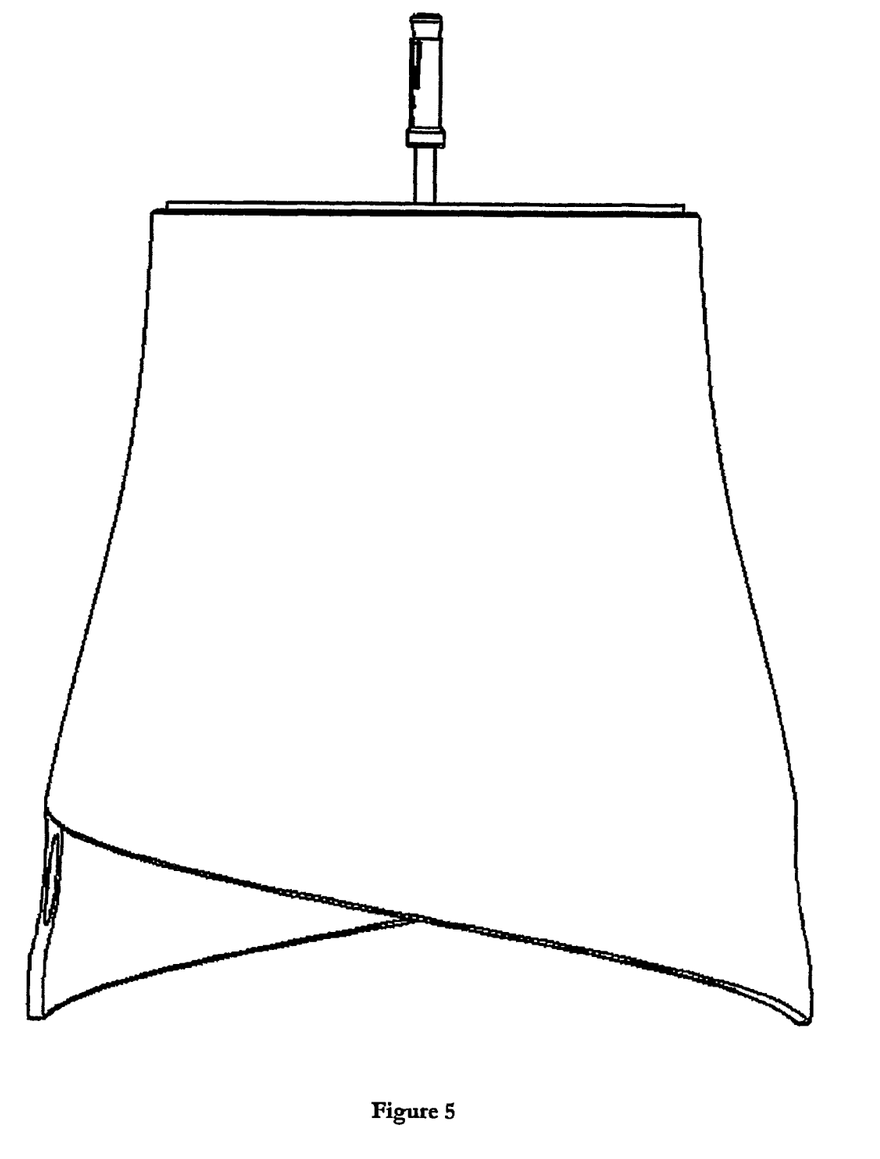
FIG. 5 is a top plan view of the preferred implementation.

FIGS. 3-5 show a preferred implementation; this comprises a one piece white polypropylene unit, formed as a cylinder of approximately 250 mm diameter at its widest and 275 mm maximum length. The outward facing edge of the cylinder is a sinuous curve defining two flanges. During installation, two bolts extending from or through the rear face of the cylinder are secured to a wall or other appropriate structure (e.g. a stand for retail and exhibition purposes), with the bolts being able to slide in channels in the rear face to allow the orientation of the cylindrical body to be altered during installation of the system to enable frames of different geometries and sizes to be securely held between the flanges. The bolts may pass through circular bolt holes in a circular hub placed inside the cylindrical body; the hub may have an image of a bicycle or other logo and include branding and other kinds of customisation. This circular hub is hence fixed relative to the bolts, but the cylindrical body can be rotated about it during installation. To facilitate correct rotation of the cylindrical body, it is possible to include markers on the central hub that align with different markers on the inside of the cylindrical body. A simple ratchet mechanism can also be deployed to control rotation of the body.

Once the correct orientation is established, the cylindrical body is then fixed relative to the bolts as part of installation at the desired orientation.

In use, a bicycle frame is lifted into position and onto the flange that will support it; this flange should face to the rear of the bicycle, which is the heavier end. The sinuous shape of the cylindrical edge facilitates this process. Once the frame is resting on the supporting flange, it can be allowed to gradually tip back towards the rear of the bicycle until the top of the frame contacts the other flange; the two flanges will then securely grip the frame. Small elastomer pads can be positioned inside each flange to prevent any damage to the frame.

Figure 6:
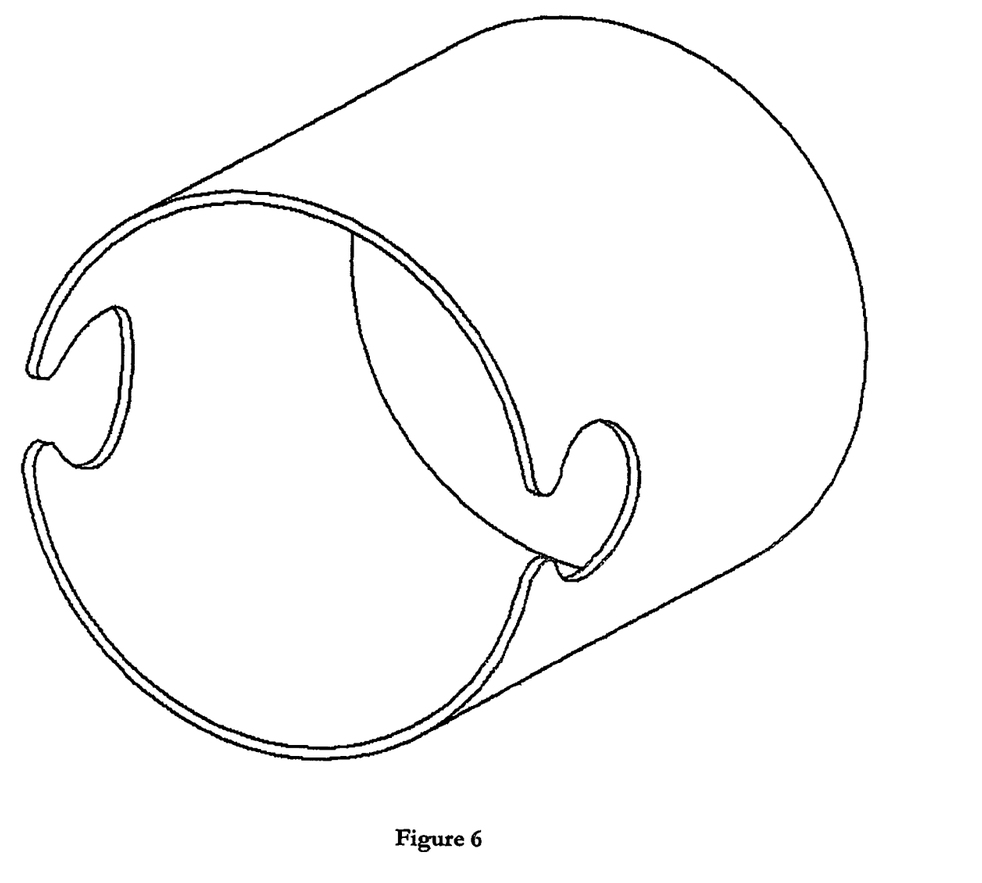
Figure 7:
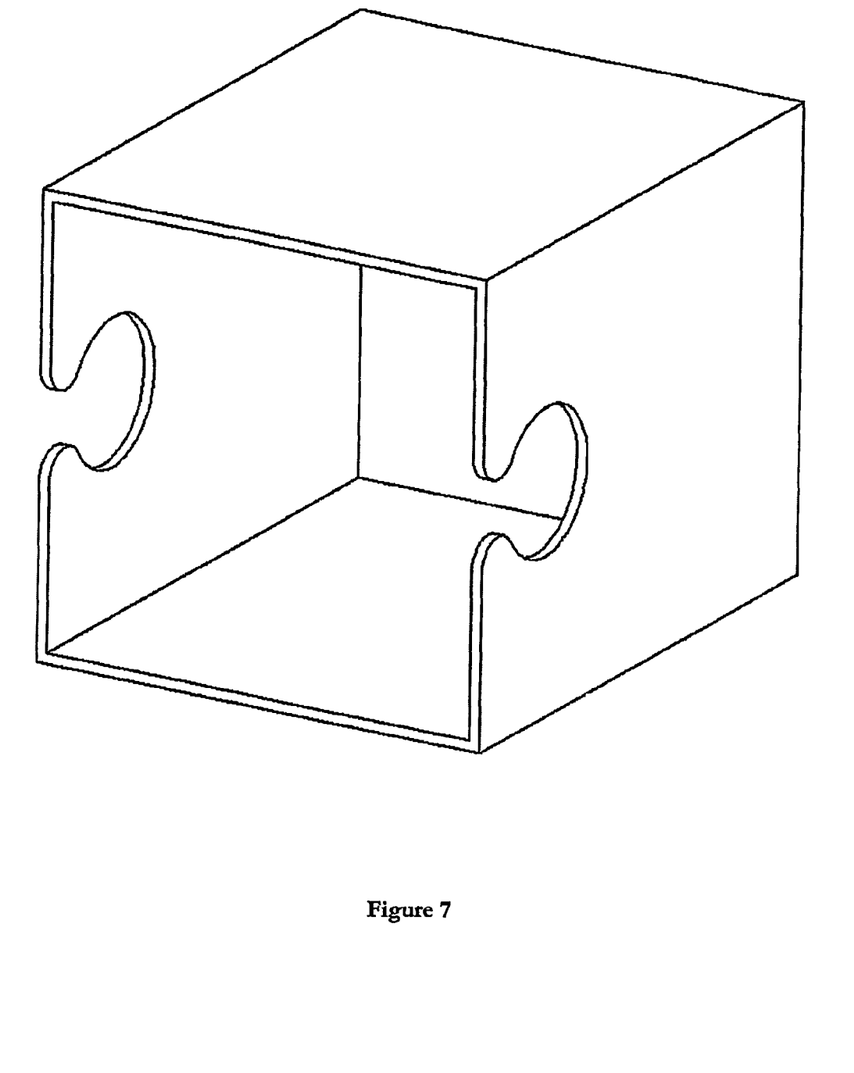
Figure 8:
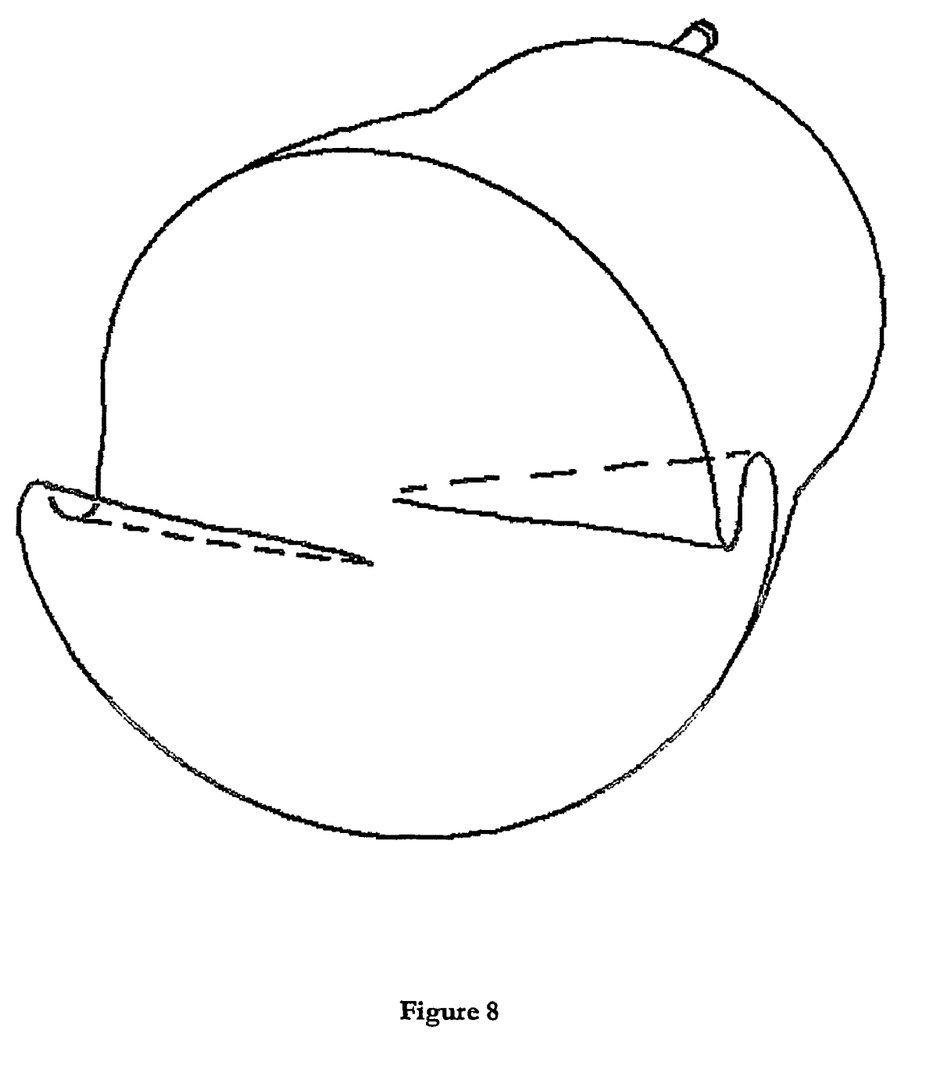

FIGS. 6, 7 and 8 show alternative shapes for the unit; FIG. 8 has a solid front face to the unit. The operation of each of these implementations is the same as the preferred implementation.

It is also possible to mount a pair of units together, back-to-back, using an intermediary collar (not shown). The combined unit can then be supported on a stand. The stand can be vertically extended to support several such combined units; this is particularly effective for retail and exhibition displays of bicycles.

The invention claimed is:

1. A bicycle storage system for storing a bicycle, said system formed as a unit and the unit including a rear face that is adapted to be fixed to a wall abutting the rear face, said unit comprising:
   (i) a first region defining an upwardly facing aperture, the first region shaped to support a lower surface to a rear of a bicycle frame so that the frame can rotate about this first region under the weight of the rear of the bicycle; and
   (ii) a second region defining a downwardly facing aperture, the second region shaped to contact an upper surface of the frame to prevent further rotation of the frame about the first region, the first and second regions being arranged to then securely hold the frame;
   in which the first and the second regions are formed as a single, continuous edge or face of the unit, and
   in which the single, continuous edge or face is a sinuous edge or face.

2. The bicycle storage system of claim 1 in which the first and the second regions are each formed as semi-circular regions of the unit.

3. The bicycle storage system of claim 1 in which the unit is a one piece molded object.

4. The bicycle storage system of claim 1 in which the unit is hollow and bicycle accessories can be stored within the hollow unit.

5. The bicycle storage system of claim 1, comprising bolts that secure the unit to a wall or other appropriate structure, with the bolts being able to slide in channels in a face of the unit abutting the wall or the other appropriate structure, to allow the orientation of the unit to be altered during installation of the system to enable frames of different geometries and sizes to be securely held between the regions, with the unit being fixed relative to the bolts as part of installation.

6. The bicycle storage system of claim 1, wherein said bicycle storage system comprises a domestic storage system.

7. The bicycle storage system of claim 1, wherein said bicycle storage system comprises a retail or exhibition storage system.

8. The bicycle storage system of claim 1, wherein said bicycle storage system comprises a bicycle storage system in an office, educational institution or public space.

9. The bicycle storage system of claim 1, comprising bolts that secure the unit to a stand for retail and exhibition purposes, with the bolts being able to slide in channels in a face of the unit abutting the stand for retail and exhibition purposes, to allow the orientation of the unit to be altered during installation of the system to enable frames of different geometries and sizes to be securely held between the regions, with the unit being fixed relative to the bolts as part of installation.

10. The bicycle storage system of claim 1, comprising bolts that secure the unit to a support structure, with the bolts being able to slide in channels in a face of the unit abutting the support structure, to allow the orientation of the unit to be altered during installation of the system to enable frames of different geometries and sizes to be securely held between the regions, with the unit being fixed relative to the bolts as part of installation.

11. Method of storing a bicycle using a bicycle storage system, said system formed as a unit and the unit including a rear face that is adapted to be fixed to a wall abutting the rear face, said unit comprising:
   (i) a first region defining an upwardly facing aperture, the first region shaped to support a lower surface to a rear of a bicycle frame so that the frame can rotate about this first region under the weight of the rear of the bicycle; and
   (ii) a second region defining a downwardly facing aperture, the second region shaped to contact an upper surface of the frame to prevent further rotation of the frame about the first region, the first and second regions being arranged to then securely hold the frame and the first and the second regions being formed as a single, continuous sinuous edge, comprising the steps of:
      (a) lifting a bicycle frame into position and onto the first region, the first region facing to the rear of the bicycle, which is the heavier end; and
      (b) allowing the bicycle frame to gradually tip back towards the rear of the bicycle until the top of the frame contacts the second region, the first and second regions then securely gripping the frame.

12. A bicycle storage system for storing a bicycle, said system formed as a unit and the unit including a rear face that is adapted to be fixed to a wall abutting the rear face, said unit comprising:
   (i) a first region defining an upwardly facing aperture, the first region shaped to support a lower surface to a rear of a bicycle frame at a first point so that the frame can rotate about this first region under the weight of the rear of the bicycle; and
   (ii) a second region defining a downwardly facing aperture, the second region shaped to contact an upper surface of the frame at a second point to prevent further rotation of the frame about the first region, the first and second regions being arranged to then securely hold the frame, wherein a vector from the first point to the second point is generally parallel to a general plane of extension of the bicycle frame;
   in which the first and the second regions are formed as a single, continuous edge or face of the unit, and
   in which the single, continuous edge or face is a sinuous edge or face.

13. A bicycle storage system for storing a bicycle, said system formed as a unit and the unit including a rear face that is adapted to be fixed to a wall abutting the rear face, said unit comprising:

(i) a first region defining a first aperture, the first region shaped to support a lower surface of a bicycle frame; and (ii) a second region defining a second aperture, the second region shaped to contact an upper surface of the frame, wherein the torque on the bicycle about the first region is equal and opposite to the torque on the bicycle provided by the second region;

in which the first and the second regions are formed as a single, continuous edge or face of the unit, and in which the single, continuous edge or face is a sinuous edge or face.

14. The bicycle storage system of claim 13, wherein the first aperture is upwardly facing, and the second aperture is downwardly facing.

15. The bicycle storage system of claim 13 in which the first and the second regions are each formed as semi-circular regions of the unit.

16. The bicycle storage system of claim 13 in which the unit is a one piece molded object.

17. The bicycle storage system of claim 13 in which the unit is hollow and bicycle accessories can be stored within the hollow unit.

18. The bicycle storage system of claim 13, comprising bolts that secure the unit to a wall or other appropriate structure, with the bolts being able to slide in channels in a face of the unit abutting the wall or the other appropriate structure, to allow the orientation of the unit to be altered during installation of the system to enable frames of different geometries and sizes to be securely held between the regions, with the unit being fixed relative to the bolts as part of installation.

19. The bicycle storage system of claim 13, wherein said bicycle storage system comprises a domestic storage system.

20. The bicycle storage system of claim 13, wherein said bicycle storage system comprises a retail or exhibition storage system.

21. The bicycle storage system of claim 13, wherein said bicycle storage system comprises a bicycle storage system in an office, educational institution or public space.

22. The bicycle storage system of claim 13, comprising bolts that secure the unit to a stand for retail and exhibition purposes, with the bolts being able to slide in channels in a face of the unit abutting the stand for retail and exhibition purposes, to allow the orientation of the unit to be altered during installation of the system to enable frames of different geometries and sizes to be securely held between the regions, with the unit being fixed relative to the bolts as part of installation.

23. The bicycle storage system of claim 13, comprising bolts that secure the unit to a support structure, with the bolts being able to slide in channels in a face of the unit abutting the support structure, to allow the orientation of the unit to be altered during installation of the system to enable frames of different geometries and sizes to be securely held between the regions, with the unit being fixed relative to the bolts as part of installation.

24. Method of storing a bicycle using a bicycle storage system, said system formed as a unit and the unit including a rear face that is adapted to be fixed to a wall abutting the rear face, said unit comprising:

(i) a first region defining a first aperture, the first region shaped to support a lower surface of a bicycle frame; and (ii) a second region defining a second aperture, the second region shaped to contact an upper surface of the frame, in which the first and the second regions are formed as a single, continuous sinuous edge and wherein the torque on the bicycle about the first region is equal and opposite to the torque on the bicycle provided by the second region comprising the steps of:

(a) lifting a bicycle frame into position and onto the first region, the first region facing to the rear of the bicycle, which is the heavier end, and (b) allowing the bicycle frame to gradually tip back towards the rear of the bicycle until the top of the frame contacts the second region; the first and second regions then securely gripping the frame.

25. Method of storing a bicycle using a bicycle storage system, said system formed as a unit and the unit including a rear face that is adapted to be fixed to a wall abutting the rear face, said unit comprising:

(i) a first region defining an upwardly facing aperture, the first region shaped to support a lower surface to a rear of a bicycle frame at a first point so that the frame can rotate about this first region under the weight of the rear of the bicycle; and (ii) a second region defining a downwardly facing aperture, the second region shaped to contact an upper surface of the frame at a second point to prevent further rotation of the frame about the first region, the first and second regions being arranged to then securely hold the frame, wherein a vector from the first point to the second point is generally parallel to a general plane of extension of the bicycle frame, and wherein the first and the second regions are formed as a single, continuous sinuous edge; comprising the steps of:

(a) lifting a bicycle frame into position and onto the first region, the first region facing to the rear of the bicycle, which is the heavier end, and (b) allowing the bicycle frame to gradually tip back towards the rear of the bicycle until the top of the frame contacts the second region; the first and second regions then securely gripping the frame.

* * * * *